United States Patent [19]

Breant et al.

[11] Patent Number: 5,747,605

[45] Date of Patent: May 5, 1998

[54] MIXTURES OF POLYMERS INCLUDING A HALOGEN-CONTAINING POLYMER AND COMPATIBILIZED WITH A GRAFTED ALIPHATIC POLYESTER

[75] Inventors: Patrice Breant, Serquigny; Alain Bouilloux, Bernay, both of France

[73] Assignee: Elf Atochem S.A., France

[21] Appl. No.: 555,231

[22] Filed: Nov. 8, 1995

[30] Foreign Application Priority Data

Nov. 8, 1994 [FR] France ................................. 94 13368

[51] Int. Cl.[6] ............................................. C08F 20/00
[52] U.S. Cl. ......................... 525/437; 528/271; 528/272; 528/302; 528/354; 525/361; 525/437; 525/438; 525/439; 525/445; 525/447; 525/450
[58] Field of Search ................................ 528/271, 272, 528/302, 354, 361; 525/437, 438, 439, 445, 447, 450

[56] References Cited

U.S. PATENT DOCUMENTS

| | | |
|---|---|---|
| 3,825,622 | 7/1974 | Robeson et al. . |
| 3,855,357 | 12/1974 | Harris et al. . |
| 3,884,994 | 5/1975 | Critchfield et al. . |

FOREIGN PATENT DOCUMENTS 3-52952  3/1991  Japan .

OTHER PUBLICATIONS

Patent Abstracts of Japan, vol. 15, No. 197 (C–833), May, 1991.

*Primary Examiner*—Samuel A. Acquah
*Attorney, Agent, or Firm*—Bell, Boyd & Lloyd

[57] ABSTRACT

The invention relates to mixtures of polymers including at least one halogen-containing polymer and compatibilized with a grafted aliphatic polyester. The compatibilizing agent may be, for example, a polycaprolactone grafted with maleic anhydride or glycidyl methacrylate.

12 Claims, No Drawings

MIXTURES OF POLYMERS INCLUDING A HALOGEN-CONTAINING POLYMER AND COMPATIBILIZED WITH A GRAFTED ALIPHATIC POLYESTER

FIELD OF THE INVENTION

Description

The invention relates to mixtures of polymers including a halogen-containing polymer and compatibilized with a grafted aliphatic polyester.

It also relates to grafted aliphatic polyesters and to the process for their preparation.

BACKGROUND OF THE INVENTION

Teyssie et al. describe block copolymers of polystyrene and of polycaprolactone permitting the compatibilization of mixtures of polystyrene and of polyvinyl chloride (Heuschen and Teyssie, Polymer Vol. 31 August, pp. 1473 to 1480 (1990)).

Chung et al. describe polycaprolactone grafted polypropylenes by Ziegler-type copolymerization of propylene and of borane derivatives carrying unsaturated functional groups; after hydrolysis, these copolymers then react anionically with ε-polycaprolactone to result in products which are effective compatibilizing agents for mixtures of polypropylene and of polycarbonate or of polyvinyl chloride (Chung, Macromolecules Vol. 27 pp. 1313 to 1319 (1994)).

The Daicel Japanese patent (JP 03052952 A published on 7 Mar. 1991) describes the synthesis of a copolymer of styrene, of maleic anhydride and of unsaturated derivatives modified with caprolactone solution and their use as compatibilizing agents for mixtures of polyamide and of polyvinyl chloride or of polyester.

These different synthesis routes are generally long and tricky, and therefore costly.

The Toyobo Japanese patent (JP 03188160 A published on 16 Aug. 1991) describes the use of ε-polycaprolactone grafted with maleic anhydride in the melt as a compatibilizing agent for mixtures of polycarbonate or polyester with polyamide.

It has now been found that modified aliphatic polyesters can compatibilize mixtures of polymers including a halogen-containing polymer.

DESCRIPTION OF THE INVENTION

The present invention relates to mixtures of polymers including at least one halogen-containing polymer and compatibilized with a grafted aliphatic polyester.

Halogen-containing polymers which may be mentioned by way of example are PVC, chlorinated PVC, plasticized PVC, PVC-based compounds, PVDF and its copolymers or PVF3 (polytrifluoroethylene).

The grafted aliphatic polyester compatibilizes a halogen-containing polymer with any other polymer which has little or no compatibility with Examples which may be mentioned are ethylene-vinyl alcohol (EVOH) copolymers, polyesters such as polyethylene terephthalate (PET) or polybutylene terephthalate (PBT), polystyrene (PS) and polyamides (PA).

The aliphatic polyester may be chosen from polylactones such as polycaprolactone polypivalolactone or polyenantholactone or polycaprylolactone.

At least one monomer chosen from the following is grafted onto the aliphatic polyester:

unsaturated carboxylic acids, their salts, their esters and their anhydrides, unsaturated products carrying epoxidized functional groups, vinyl esters, styrene and its derivatives.

Examples which may be mentioned are:

(meth)acrylic acid, fumaric acid, mesaconic acid, alkyl(meth)acrylates such as methyl methacrylate, butyl acrylate, tert-butyl acrylate or hydroxyethyl acrylate, citraconic anhydride, itaconic anhydride, tetrahydrophthalic anhydride, 2-methylmaleic anhydride, 2,3-dimethylmaleic anhydride and maleic anhydride, aliphatic glycidyl esters and ethers such as glycidyl (meth)acrylate, glycidyl maleate, glycidyl itaconate, vinyl glycidyl ether and alkyl glycidyl ethers.

Alicyclic glycidyl esters and ethers may also be mentioned, such as 2-cyclohex-1-ene glycidyl ether, diglycidyl cyclohexene-4,5-dicarboxylate, glycidyl cyclohexene-4-carboxylate, glycidyl 2-methyl-5-norbornene-2-carboxylate and diglycidyl endocis-bicyclo[2.2.1]-5-heptene-2,3-dicarboxylate, vinylcyclohexene monoxide and METHB, vinyl acetate.

The grafting may be performed in an extruder in the melt in the presence of radical initiators.

The quantity of grafted monomer is generally lower than 15% by weight of the aliphatic polyester.

It is well known that aliphatic polyesters, and in particular polycaprolactone, are sensitive to attack by the radicals initiated by thermal decomposition of appropriate initiators such as peroxides. In the absence of any other reactant this radical attack results in the modification of the molecular structure of the starting material by branching the polymer chains with one another: this modification is called long branching and, if the quantity of radicals produced is sufficient, results in crosslinking of the polymer.

In addition, aliphatic polyesters such as polylactones, generally obtained by polycondensation reactions, have linear molecular chains and, as a result, above the melting point of their crystalline regions, a very low melt viscosity, generally incompatible with good handleability of the product leaving, for example, an extruder. In addition, this low melt viscosity may be detrimental to good compatibility or good miscibility of this product, even with polymers considered to be miscible or compatible and, as a result, may be detrimental to the action of desired compatibilization of polymer mixtures. As a result of the branching reactions in parallel with the grafting reaction, melt grafting in an extruder, through the intermediacy of radical initiators, allows the viscosity of the polymer to be considerably increased and made more suitable for subsequent mixing.

For example, grafting of ε-polycaprolactone in the melt, in an extruder, typically takes place in the following conditions:

The extruder employed, of Werner 30 type, is a corotative twin-screw extruder which has a temperature profile as described in the table below:

| PCL entry zone | Reactant injection zone | REACTION ZONES | | Degassing zone | | Exit die |
|---|---|---|---|---|---|---|
| 20° C. | 120° C. | 210° C. | 210° C. | 220° C. | 220° C. | 220° C. |

The polycaprolactone entry zone is kept low (20° C.) because of the low melting point of the product (60° C.) in order to avoid blockages at the feed throat and good transport of the product.

The screw speed is typically 200 revolutions/minute at an extrusion throughput of approximately 20 kg/h.

Volatile reaction products are removed in a degassing zone at a maximum vacuum.

The temperature of the reaction zones is adapted to the radical initiator employed and to the residence time of the reactants in such a way that all the radical initiator is at least 99.9% decomposed. They are typically 210° C. for initiators like DBPH (2,5-dimethyl-2,5-(di-tert-butylperoxy)hexane) or DICUP (dicumyl peroxide), 190° C. for TMCH (1,1-di (tert-butylperoxy)-3,3,5-trimethylcyclohexane or 175° C. for benzoyl peroxide.

Numerous radical initiators may be employed for grafting aliphatic polyesters; examples which may be mentioned are diacyl peroxides, peroxides derived from ketonic compounds, peroxydicarbonates, peroxyesters, dialkyl peroxides, peroxides of organosulphonyl derivatives and peroxyacetals.

The radical initiator is usually diluted in a solvent (for example trichlorobenzene), but it can be employed as it is if it is liquid (for example DBPH). It is generally injected with a metering pump into the molten aliphatic polyester at a temperature which is sufficiently low for the initiator to be able to be suitably mixed into the melt before starting to decompose and to react. It can also be introduced as a mixture with an appropriate powdered polymer in the same place as the aliphatic polyester granulate, by means of an appropriate metering device.

The monomers are generally injected into the melt with a metering pump, if they are liquid, into the same injection zone as that for the radical initiator. Sometimes, for greater convenience the monomer may act as a solvent for the radical initiator.

When the monomers are in solid form, they are generally introduced in the same place as the aliphatic polyester granulate by means of an appropriate metering device.

Some of these grafted aliphatic polyesters are novel, in particular those grafted with unsaturated products carrying epoxidized functional groups. The invention relates also to these products.

The present invention relates also to grafted aliphatic polyesters which have the following chain sequences:

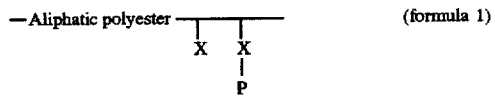         (formula 1)

X is a unit derived from a monomer that can be grafted by a radical mechanism onto an aliphatic polyester and that has a functional group capable of reacting with an amine unit, P is derived from a polyamide of formula:

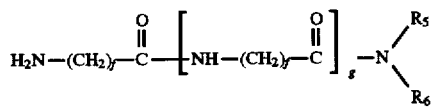

in which:

f is a number between 3 and 11, g denotes the degree of polymerization. Polyamides or polyamide oligomers may be employed, $R_5$ is hydrogen or a linear or branched alkyl group containing up to 20 carbon atoms, $R_6$ is a group which has up to 20 carbon atoms, linear or branched alkyl or alkenyl, a saturated or unsaturated cycloaliphatic radical, an aromatic radical or a combination of the above.

It is quite clear that X denotes either the residue of the grafted monomer or the residue of the grafted monomer which has subsequently reacted with the polyamide or the polyamide oligomer P. All or part of the monomers X may be employed for grafting the units P.

The total quantity of monomer and of grafted polyamide is generally lower than 15% by weight of the quantity of aliphatic polyester.

The monomer X may be chosen from unsaturated carboxylic acids and anhydrides of unsaturated carboxylic acids. Examples of these products have been cited above. Maleic anhydride is advantageously employed. The grafting of X is performed as above. The polyamide P is added next.

For example, if the aliphatic polyester is PCL and if X is maleic anhydride and P a polyamide 6 oligomer, the compatibilizing agent will be denoted in the text which follows as PA6 oligomer-grafted PCl.

This monoamine polyamide can be obtained by polycondensation of an amino acid of formula:

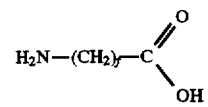

or by polyaddition of a lactam of formula:

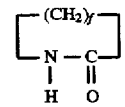

in which f has the meaning given above, in the presence of a monofunctional polymerization limiter of formula:

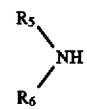

in which $R_5$ and $R_6$ have the meanings given above.

The preferred amino acid or lactam monomers for the synthesis of the monoamine polyamide according to the invention are chosen from caprolactam, 11-aminoundecanoic acid or dodecalactam.

The preferred monofunctional polymerization limiters are laurylamine and oleylamine.

The polycondensation defined above is performed according to the processes which are usually known, for example at a temperature which is generally between 200° and 300° C., under vacuum or in inert atmosphere, with stirring of the reaction mixture.

The mean chain length is determined by the initial molar ratio of the polycondensable monomer or the lactam to the monofunctional polymerization limiter.

To calculate the mean chain length, one molecule of chain limiter is usually counted per one oligomer chain.

The addition of the monoamine polyamide to the aliphatic polyester grafted with a monomer X takes place by reaction of an amine functional group of the polyamide with at least one anhydride or acid functional group of the grafted polyester. Amide or imide bonds are thus created.

The addition of P to the grafted aliphatic polyester is carried out preferably in the melt. The polyamide and the grafted aliphatic polyester may thus be blended in an extruder at a temperature which is generally between 230° and 250° C. The mean residence time of the melt in the extruder may be between 10 s and 3 minutes and preferably between 1 and 2 minutes. The present invention also relates to mixtures of polymers including at least one halogen-containing polymer and compatibilized with aliphatic polyesters grafted (i) with a monomer which has a functional group that can react with an amine unit and which is preferably an unsaturated carboxylic acid or an anhydride of unsaturated carboxylic acid and (ii) with monoamine polyamides which have reacted with all or part of the above monomers.

The halogen-containing polymers and the other polymers to be compatibilized are those already referred to above.

The mixtures of the invention may be mixtures of PVC and of EVOH.

Large volumes of polyvinyl chloride are employed in the manufacture of bottles for still mineral waters. Because of its mediocre permeability to gases, it finds little application for sparkling mineral waters, with the exception of bottles of greater thickness than the norm. EVOH is a polymer that is well known for its high imperviousness to gases. It is therefore advantageous to produce mixtures of PVC and of EVOH in small quantities in order to improve the gas permeability of PVC. Since the two polymers are incompatible, a third component must be employed to obtain a compatibilized mixture that has good properties.

Patent FR 2634489 describes the use of polyesteramides for compatibilizing the mixture of the two polymers. The polyesteramides described have an ester portion which is derived from mixtures of terephthalic acids and of adipic acid with 1,4-butanediol and an amide portion which is derived from caprolactam.

Patent WO 91/09084 describes the use of PVC grafted with acrylic monomers or polyurethanes or unsaturated derivatives of carboxylic acids or the use of polyurethanes for compatibilizing the PVC/EVOH mixture.

It has been found that aliphatic polyesters modified by grafting, preferably with anhydrides of unsaturated carboxylic acids, make it possible to obtain a mixture of PVC and of EVOH with good properties.

The proportion of EVOH may be, for example, up to 20% by weight of the EVOH-PVC mixture.

The quantity of compatibilizing agent is from 1 to 10% by weight of the EVOH/PVC mixture, and preferably 2 to 5%.

The mixtures of the invention may also be PVC/PET mixtures.

The recycling of the PVC in the mineral water bottles requires a preliminary collection of the bottles from individuals or from communal collection points. This PVC is always to be found mixed with PET originating either from sparkling mineral water or fruit juice bottles. This intermixing precludes correct recycling of PVC because of the high temperatures needed for processing PET in an extruder, temperatures that result in the degradation of PVC. Sorting of the two materials is then necessary, but traces of PET remain in the PVC in the present state of the existing sorting possibilities. It is therefore necessary to be able to compatibilize the PET residues with the PVC without degrading the latter.

Akovali et al. compatibilize PVC/PET mixtures by dissolving the two polymers in a common solvent (phenol/tetrachloroethane mixture) and adding in solution a PET modified with vinyl chloride after plasma irradiation (J. A. P. S. Vol. 50 pp. 1747–1752 (1993)). This technique is lengthy and costly and requires the use of solvents which are tricky to handle and to recycle.

It has been found that grafted aliphatic polyesters permit good compatibilizing of the PVC/PET mixture where the PET is in very low proportions (lower than 5%) by passage as a melt in a conventional extruder.

Grafting with an anhydride of an unsaturated carboxylic acid, such as maleic anhydride, or grafting with an unsaturated product bearing an epoxidized functional group, such as glycidyl methacrylate (GMA) is preferably employed.

The invention is particularly useful for mixtures of up to 85/15 (PVC/PET).

It has been found that grafted aliphatic polyesters compatibilize polyvinyl halides and polystyrene. Polystyrene is intended to mean a styrene homopolymer or copolymer. The quantity of PS in the mixture may be predominant or minor.

The mixtures of the invention are, for example, PVC/PS and PVDF/PS mixtures.

Aliphatic polyesters grafted with styrene or its derivatives are preferably employed for these mixtures. In particular, ε-polycaprolactone modified by grafting styrene makes it possible to compatibilize polyvinyl halide/polystyrene mixtures by improving interphase adhesion.

The mixtures of the invention may also be mixtures of PVDF with polyamides, polyesters or EVOH.

PVDF/PA and PVDF/EVOH mixtures are preferably compatibilized with (a) an aliphatic polyester grafted with anhydrides of unsaturated carboxylic acids or (b) aliphatic polyesters grafted (i) with anhydrides of unsaturated carboxylic acids and (ii) with monoamine polyamides by reaction with all or part of the above anhydrides (i).

The PVDF and EVOH may be in any quantities, it being possible for the PA to be in a majority or minority. The reaction relates advantageously to PVDF/EVOH mixtures containing up to 40% by weight of EVOH.

The invention also relates to mixtures of PVDF and of polyester such as, for example, PET or PBT.

The PVDF/PBT mixtures are preferably compatibilized with aliphatic polyesters grafted with unsaturated products carrying epoxidized functional groups. The PVDF and PBT may be in any proportions.

The invention also relates to PVC/PA mixtures compatibilized preferably (a) with aliphatic polyesters grafted with anhydrides of unsaturated carboxylic acids or with unsaturated products carrying epoxidized functional groups or (b) with aliphatic polyesters grafted (i) with anhydrides of unsaturated carboxylic acids and (ii) with monoamine polyamides by reaction with all or part of the above anhydrides (i).

It would not constitute a departure from the scope of the invention to add usual additives such as UV stabilizers, antioxidants, plasticizers etc. to the mixtures.

EXAMPLES

Examples 1 to 11 (and 1 bis to 11 bis):
GRAFTING OF MALEIC ANHYDRIDE

The polycaprolactones employed are of high molecular weights and of two types:

Tone 767E supplied by Union Carbide Company, of melt index of 30 dg/min, measured at 190° C. under a 2.16-kg load.

Capa 680, supplied by Solvay Interox, of molecular mass of 80,000 and of melt index of 4.5 dg/min, measured at 190° C. under a 2.16-kg load.

The grafting is performed by following the general protocol mentioned in the description.

The initiator employed is DBPH (Luperox 101): the grafting yields and the viscosity changes depend on the maleic anhydride (MAH) and DBPH contents introduced.

The grafted maleic anhydride is determined by FTIR infrared spectroscopy on the characteristic band at 1785 cm$^{-1}$, on a 100-μm film obtained by pressing at 180° C. for 1 min 30 s, after subtraction of the spectrum of the starting material.

The melt index (MI) is measured at 190° C. under a 2.16-kg load and is expressed in dg/min.

The grafted glycidyl methacrylate is determined by infrared spectroscopy (FTIR) after calibration with the monomer on the characteristic absorption band at 910 cm$^{-1}$ on a film of 100-μm thickness obtained by pressing at 190° C. for 1 min 30 s.

The melt index is measured as in Examples 1 to 11.

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| MAH content introduced, % | 1.5 | 1.5 | 1.5 | 2 | 2 | 2 | 2 | 2.5 | 2.5 | 2.5 | 2.5 |
| DBPH content introduced, % | 0.2 | 0.3 | 0.4 | 0.2 | 0.3 | 0.4 | 0.5 | 0.2 | 0.3 | 0.4 | 0.60 |

For Tone 767E PCL:

| | | | | | | | | | | | |
|---|---|---|---|---|---|---|---|---|---|---|---|
| MI | 16 | 10.1 | 4.6 | 18.8 | 13.1 | 4.9 | 2.5 | 17.2 | 13.6 | 6.6 | 0.5 |
| % grafted | 0.8 | 0.7 | 0.7 | 0.85 | 1.04 | 1.12 | 1.48 | 1.02 | 0.96 | 1.5 | 1.5 |
| Yield, % | 53 | 46 | 46 | 42.5 | 52 | 56 | 74 | 41 | 38 | 60 | 60 |

For Capa 680 PCL:

| | Example No. | | | | | | | | | | |
|---|---|---|---|---|---|---|---|---|---|---|---|
| | 1 bis | 2 bis | 3 bis | 4 bis | 5 bis | 6 bis | 7 bis | 8 bis | 9 bis | 10 bis | 11 bis |
| MI | 4.3 | 2.7 | 0.55 | 4.5 | 5.8 | 3.5 | | 4.6 | 5.1 | 4.5 | 1.9 |
| % grafted | 0.67 | 0.92 | 0.93 | 0.65 | 0.84 | 1.03 | | 0.67 | 1 | 0.9 | 1.3 |
| Yield, % | 47 | 61 | 62 | 32.5 | 42 | 51.5 | | 27 | 40 | 35 | 52 |

Examples 12 to 21: GRAFTING OF GLYCIDYL METHACRYLATE

We describe the novel preparation of polycaprolactone grafted with glycidyl methacrylate.

The grafting is performed by following the general protocol on Tone P767E PCL.

The peroxide employed is DBPH (Luperox 101).

| | Example No. | | | | | | | | | |
|---|---|---|---|---|---|---|---|---|---|---|
| | 12 | 13 | 14 | 15 | 16 | 17 | 18 | 19 | 20 | 21 |
| GMA Content introduced % | 1.5 | 1.5 | 1.5 | 2 | 2 | 2 | 2.5 | 2.5 | 2.5 | 2.5 |
| DBPH content introduced % | 0.2 | 0.3 | 0.4 | 0.2 | 0.3 | 0.4 | 0.2 | 0.3 | 0.4 | 0.6 |
| MI | 24.7 | 17.6 | 12.4 | 24.6 | 21 | 14.1 | 24.3 | 21.9 | 20.3 | 13.1 |
| GMA grafted, % | 1 | 0.7 | 0.8 | 0.7 | 0.9 | 1 | 0.6 | 0.8 | 0.9 | 1.2 |
| Yield, % | 67 | 47 | 53 | 35 | 45 | 50 | 24 | 32 | 36 | 48 |

Examples 22 to 25: GRAFTING OF STYRENE

We describe the novel preparation of polycaprolactones grafted with styrene. 20 The grafting is performed by following the general protocol on Capa 680 PCL. The radical initiator employed is TMCH (1,1-di(tert-butylperoxy)-3,3,5-trimethylcyclohexane) (Luperox 231M50 as 50% solution in a mineral oil) or DBPH.

The grafted styrene is determined by infrared spectroscopy (FTIR) after calibration with the monomer on the characteristic absorption band at 695 cm$^{-1}$ on a film of 100-μm thickness obtained by pressing at 190° C. for 1 min 30 s.

The melt index is measured as in the case of Examples 1 to 11.

| Example No. | 22 | 23 | 24 | 25 |
|---|---|---|---|---|
| Styrene content introduced, % | 9.5 | 9.5 | 30 | 30 |
| Nature of the peroxide | DBPH | DBPH | TMCH | TMCH |
| Peroxide content introduced, % | 0.55 | 0.95 | 0.12 | 0.375 |
| MI | 11.6 | 5.4 | | |
| Styrene grafted, % | 7.6 | 9.4 | 6.3 | 13.5 |
| Yield, % | 80 | 99 | 21 | 45 |

Examples E and F: GRAFTING OF POLYCAPROLACTONE WITH MALEIC ANHYDRIDE AND THEN A POLYAMIDE OLIGOMER

Example E

A granulate mixture consisting of 100 parts of MA-grafted PCL of Example 5 and 24.5 parts of PA6 monoNH$_2$ oligomers of mass 2500 are introduced into the hopper of a 30-mm diameter twin-screw Werner extruder. The throughput is 15 kg/hour and the stock temperature in the region of 200° C. A homogeneous strand corresponding to the grafting of the PA6 oligomers onto the MA-grafted PCL is obtained, after cooling, at the extruder exit.

Example F

The procedure is as in Example E except that the MA-grafted PCL of Example 5 is replaced with the MA-grafted PCL of Example 7. The proportions are 100 parts of MA-grafted PCL and 9.25 parts of monoNH$_2$ PA6 oligomer. Here too, granulate of a homogeneous material is obtained after extrusion.

Example A—PVC/EVOH MIXTURE

The polycaprolactone grafted with maleic anhydride of Example 9 was employed.

The PVC/EVOH/modified PCL mixtures were produced on a corotative twin-screw Werner 30 extruder with a temperature profile as described below, in conditions such that the EVOH is melted without having any untimely degradation of the PVC.

| Polymer entry zone | MIXING ZONES | | | | Degassing zone | Exit die |
|---|---|---|---|---|---|---|
| 160° C. | 180° C. | 190° C. | 200° C. | 180° C. | 180° C. | 180° C. |

The PVC employed is the Elf Atochem S071S grade (viscosity number=80 (iso 174) K value=57), and the EVOH is Soarnol DT (containing 29 mol % of C$_2$H$_4$. Mi=7 dg/min at 190° C. under 2.16 kg). The quantity of EVOH is 10% and that of the modified polycaprolactone can vary up to 5%. The compatibilizing action of the modified PCL is evaluated in comparison with a bottle-grade PVC (SEB 101 V 261) employed (VALS company) and with a PVC/EVOH (10%) mixture, where the compatibilizing agent is a polyetheramide (10% PEA) of the prior art, in comparison with patent FR 2634489 in the production of biaxially drawn bottles by evaluating the appearance of the object obtained in accordance with the heating time of the thermoforming, a technique which simulates correctly the biaxial orientation/conventional bottle blowing technique.

The operating conditions are the following:

Precalendering in the form of 400-μm film on Oilier calender.

Thermoforming on an Illig machine:

oven temperature: 500° C.

heating time: 17 s then variable vacuum/cooling: 14 s vacuum pressure: mark 5 vacuum speed: mark 6

Multicavity mould

| Test No. | A1 | A2 | A3 | A4 |
|---|---|---|---|---|
| Products | SEB 101 V 261 | PVC/EVOH/PE A | PVC/EVOH/PCL modified with 2.5% of maleic anhydride | PVC/EVOH/PCL modified with 5% of maleic anhydride |
| Heating time: 17 s | Correct | Perforation | Correct | Correct |
| Heating time: 20 s | Correct | Formable with thickness irregularity | Formable with thickness irregularity | Correct |
| Film appearance | Transparent | Milky unacceptable | Acceptable | Acceptable |

Example B: PVC/PET MIXTURES

The mixtures were manufactured on a Clextral corotative twin-screw extruder with an adapted screw profile and the following temperature profile:

| Polymer granulate entry zones | Mixing zones | Exit die |
|---|---|---|
| 200° C. | 210° C. | 170° C. |

The speed of rotation of the screws is 600 revolutions per minute.

The relative proportions of the polymers are the following:

90% of a PVC/PET (95/5) mixture originating from a collection of mineral water bottles (Sorepla company)

10% of modified ε-polycaprolactone of Examples 9 and 15.

| Test No. | B1 | B2 | B3 |
|---|---|---|---|
| Compatibilizing agent employed | None | Example 9: PCL modified 0.96% of maleic anhydride | Example 15: PCL modified 0.7% of glycidyl methacrylate |
| Elongation at break, % | 10 | 90 | 120 |
| Tensile strength, MPa | 48 | 24 | 28 |

The decrease in strength is simply an effect of plasticization of the PVC with the PCL.

Example C: PVC/PS AND PVDF/PS MIXTURES

The various mixtures were obtained on a counter-rotative twin-screw extruder of the Brabender ZSK type (L/D=7) with the following temperature profile:

| Feed zone | Mixing zone | Exit die |
|---|---|---|
| 150° C. | 175° C. | 185° C. |

The speed of the screws is 50 revolutions per minute.

The polymers employed are:

PVC (Elf Atochem Lucorlex 2109AO93) Lacqrène crystal 1531 PS (Elf Atochem), Mi=

12 dg/min at 200° C. under 5 kg

PVDF (Elf Atochem Kynar 1000HD) of Mi=10 at 250° C. under 10 kg

The interphase adhesion is scored from 0 to 3 in accordance with an increasing visual degree of adhesion. The dispersion size of the minority phase is also evaluated by scanning electron microscopy (SEM).

| | Example No. | | | | | | | | |
|---|---|---|---|---|---|---|---|---|---|
| | C1 | C2 | C3 | C4 | C5 | C6 | C7 | C8 | C9 |
| PS content, % | 70 | 63 | 63 | 30 | 27 | 70 | 63 | 30 | 27 |
| PVC content, % | 30 | 27 | 27 | 70 | 63 | | | | |
| PVDF content, % | | | | | | 30 | 27 | 70 | 63 |
| Capa 680 unmodified PCL content | | 10 | | | | | | | |
| Styrene-modified PCL content (Example 25), % | | | 10 | | 10 | | 10 | | 10 |
| Interphase adhesion | 1 | 3 | 3 | 2 | 3 | 1 | 3 | 1 | 1 |
| Disperse phase size | | coarse | fine | | | | | | |

Examples G: Mixtures

PVDF/PA

PVDF/EVOH

PVDF/PBT

PVDF/PET

PVDF/PA

PVDF/EVOH

1) Production of the blends in a small mixer

The results obtained in a small Brabender laboratory mixer (60 cm³) are examined, this being in order to evaluate the effectiveness of the third bodies (compatibilizing agents) in terms of dispersion and, above all, of interphase adhesion.

The third bodies employed are some of the grafted PCLs corresponding to the examples described above (Examples 5, 7, 14, E and F). The effect of these emulsifiers is compared with that of an ungrafted base PCL. The functionality of the grafted PCLs employed must, of course, be adjusted to the reactive groups available on the second polymer which it is desired to use in combination with the PVDF (or with the PVC). In the case of the PAs it would be advantageous to choose an MA-grafted PCL or an MA- and polyamide-grafted PCL; in the case of the PBTs a GMA-grafted PCL will have to be chosen.

The effect of the compatibilizing agent on the morphology has been evaluated by observation with scanning electron microscopy (SEM).

Interfacial adhesion: observation of the cryogenic fracture aspect of the blend. Presence or absence of free particles at the surface. Clean or blurred outline of the nodules. Nodules torn away or not. Scoring of the adhesion with a digit from 1 (poor adhesion) to 3 (excellent adhesion, smooth fracture surface).

In Table 1, PVDF is used in combination with PA6, PA66, PA11, EVOH, PBT and PET (Examples G1 to G28). The PVC is used in combination with PA11 and EVOH (G29 to G36, fewer possible pairs because of the degradation of PVC at the processing temperatures of PA6 and PA66 in particular). All the conditions adopted (compositions, temperatures and the like) appear in this table. Polymer 1, polymer 2 and third body are introduced together into the mixer, rotating at 60 rev/min, for a period between 10 and 15 minutes. A sample is then taken for inspection from the bulk of polymer obtained after leaving the mixer and cooling.

When compared with the controls without third bodies (where the morphology is always poor, score 1, Examples G1 and G7), and with the controls employing ungrafted base PCL (Tone P767E PCL, Examples G8, G14, G19 and G33), the use of the grafted PCLs produces very marked improvements in the adhesion in most cases. In the case of the PAs and the EVOHs, the best effects are obtained with MA-grafted PCLs and PA6 oligomer-grafted PCLs; in the case of the PBT it is with the GMA-grafted PCL.

The positive effect of the grafted PCLs of the invention is thus demonstrated.

PVDF 9000 HD, Mi=90 at 250° C. under 10 kg, and type SK70 PVC, which has a viscosity number of 128 (ISO 174) and a K value of 71, are employed.

TABLE 1

OBSERVED INTERFACIAL ADHESION VALUES

| | | | Polymer 1 PVDF (9000HD) | |
|---|---|---|---|---|
| Examples | Polymer 2 | Composition | Third Body | Adhesion |
| G1 | PA6 | (a) | | 1 |
| G2 | (B4) | (b) | PCL | 3 |
| G3 | T°: 250° C. | (b) | Examples 14 | 1 |
| G4 | | (b) | Example 5 | 3 |
| G5 | | (b) | Example E | 3 |
| G6 | | (b) | Example F | 3 |
| G7 | PA66 | (a) | | 1 |
| G8 | (vydine) | (b) | PCL | 1 |
| G9 | T°: 270° C. | (b) | Example 14 | 1 |

TABLE 1-continued

OBSERVED INTERFACIAL ADHESION VALUES

Polymer 1
PVDF (9000HD)

| Examples | Polymer 2 | Composition | Third Body | Adhesion |
|---|---|---|---|---|
| G10 | | (b) | Example 5 | 3 |
| G11 | | (b) | Example 7 | 3 |
| G12 | | (b) | Example E | 3 |
| G13 | | (b) | Example F | 3 |
| | PA11 | (a) | T°: 200° C. (BESHVO) | |
| G14 | (BESHVO | (b) | PCL | 1 |
| G15 | or BMNO) | (b) | Example 5 | 3 |
| G16 | | (b) | Example 7 | 1 |
| G17 | | (b) | Example E | 3 |
| G18 | | (b) | Example F | 3 |
| | EVOH | | T°: 180° C. | |
| G19 | (A4412) | (c) | PCL | 1 |
| G20 | T°: 180° C. | (c) | Example 14 | 1 |
| G21 | | (c) | Example 15 | 3 |
| G22 | | (c) | Example 7 | 3 |
| G23 | | (c) | Example F | 3 |
| G24 | PBT (TMNO) T°: 250° C. | Base mixture composition (b) | Example 14 | 3 |
| G25 | PET | (c) | PCL | 3 |
| G26 | (R78T50H) | (c) | Example 14 | 3 |
| G27 | T°: 270° C. | (c) | Example 7 | 3 |
| G28 | | (c) | Example F | 3 |

PVC SK 70

| | | | | |
|---|---|---|---|---|
| G29 | PA11 | (a) | T°: 190° C. (BMNO) | |
| G30 | (BESHVO | (b) | PCL | (c) 3 |
| G31 | or BMNO) | (b) | Example 14 | (c) 3 |
| | | (b) | Example 5 | (c) 3 |
| | | (b) | | |
| | | (b) | | |
| G32 | | | Example E T°: 170° C. | (c) 3 |
| G33 | EVOH | (c) | PCL | 1 |
| G34 | (A4412) | (c) | Example 14 | 1 |
| G35 | T°: 180° C. | (c) | Example 7 | 3 |
| G36 | | (c) | Example E | 3 |

(a): Polymer 1/Polymer 2 (65/35) composition without any third body
(b): Polymer 1/Polymer 2/TB (65/25/10) composition
(c): Polymer 1/Polymer 2/TB (70/20/10) composition
PCL: Ungrafted base PCL → Tone P767E PCL 2) Production of mixtures on a Buss continuous mixer As a result of the preliminary study on a 50-gram mixer, we chose the best pairs (adhesion score 3 in the case of mixer test) in order to extrapolate them to an extruder and to be able to evaluate the mechanical properties of the corresponding compounds. However, we limited ourselves to the combinations of potential advantage in terms of applications and of a reasonable cost. The extrapolation thus relates to the PVDF/PA6, PVDF/PA66 and PVDF/PBT blends.

The Buss PR 46/70/15D Ko-mixer makes it possible to operate continuously. This is an extruder-mixer for compounding, equipped with two feed hoppers (ports 1 and 2), a degassing port (port 3) and a 4-hole strand die. On leaving the die the strands are cooled in a water trough before granulation. The mixer part is made up of a screw and a mixer body. The rotation of the mixing screw is combined with an oscillating motion along the axis of this screw. The combination of these two motions and the alternating interaction of mixing blades in the body of the screw have an excellent mixing effect. A discharge screw (itself provided with a degassing port, port 4) makes it possible to regulate the pulsating flow generated by the mixing part. In the latter there are restriction rings (R1, R2 and R3) whose diameter we can adjust in order to regulate the shear applied to the stock. The operating conditions relating to the examples described later are listed together in Table 2.

In the case of all the examples the mixture of the granulates (polymer 1+polymer 2+third body) is produced "in the drum" and then introduced into port 1 of the mixer by means of a metering device. The throughput is 30 kg/hour. A slight vacuum (residual 300 mmHg) is applied at port 3. Ports 2 and 4 are closed. Rings R1, R2 and R3 are set at 33.5-35-35 respectively. The stock temperature profiles depend on the bases employed (higher temperatures when PA66 is used in combination).

The bases employed in our compositions are the following grades:

PVDF Foraflon 9000 HD and 1000 HD from Elf Atochem,

PBT TMNO from Elf Atochem moulding grade Shore D hardness 86

PA6 Ultramid B4 from BASF or RESNO from Elf Atochem, Mi=3.4 250° C. under 2.16 kg PA66 Vydyne 21X from Monsanto.

The compositions of the mixtures and the observations made on the strands in the course of manufacture are given in Table 3.

As a general rule, when a strand corresponding to a simple mixture of incompatible polymers, or else a badly compatibilized (ineffective third body) blend is granulated, granulates are obtained which delaminate, being often joined to one another by uncut filaments. On the other hand, when a blend worthy of this name (fine morphology, good interphase adhesion) is granulated, perfect granulates are obtained without delamination. This simple qualitative observation makes it: therefore possible to judge the quality of the blend immediately upon extrusion. This is expressed as a digit from 1 to 4 in Table 3 (granulation column).

It is also possible to assess the cohesion of the material by making a small notch in the strand and then drawing the latter in the direction of its axis. In principle, if the cohesion is good, a homogeneous deformation of the strand is obtained. On the other hand, if the cohesion is bad, delamination and fibrillation of the strand is present. This characteristic is also mentioned in Table 3.

Morphology: inspection of the sample after cold planing and selective extraction of the disperse phase (solvent). Information concerning the type of morphology (nodular or co-continuous) and the quality of the dispersion (mean particle size, homogeneity).

An inspection of the morphology is carried out using electron microscopy. Adhesion and number-average nodule diameter are also given in Table 3 for some examples.

A direct correlation exists, in fact, between granulation, cohesion of the strand, adhesion and morphology. As soon as an effective third body is introduced into the mixture, these characteristics are very markedly improved. Granulation, strand cohesion and morphology are not good in the case of the controls without third bodies (controls 1, 2 and 3) and in the case of the controls employing the ungrafted base PCL (Examples 57405, 57408, 57409 and 57415). The introduction of PCL grafted with MA or else PA6 oligomers into PVDF/PA6 and PVDF/PA66 produces good characteristics. In the case of PVDF/PBT, even though the MA- and PA6 oligomer-grafted PCLs give satisfactory results in granulation (Examples 57415 to 57419), GMA-grafted PCLs must be employed in order to obtain good granulation, cohesion, adhesion and dispersion simultaneously (Examples 57420, 420 bis, 421 and 422).

TABLE 2

| | Examples | | | | | | | | | | |
|---|---|---|---|---|---|---|---|---|---|---|---|
| | 57405 | 57406 | 57406bis | 57407 | 57407bis | 57407-2 | 57408 | 57409 | | 57411 | Control 1 |
| PVDF | 65 | 65 | 65 | 65 | 67.5 | 65 | 45 | 25 | | 25 | 65 |
| PA6 | 25 | 25 | 25 | 25 | 27.5 | 25 | 45 | 65 | | 65 | 35 |
| Ungrafted P 767 E PC1 | 10 | — | — | — | — | — | 10 | 10 | | — | — |
| MA-g PC1 of Example 5 | — | 10 | — | — | — | — | — | — | | — | — |
| MA-g PC1 of Example 7 | — | — | 10 | — | — | — | — | — | | — | — |
| GMA-g PC1 of Example 14 | — | — | — | — | — | — | — | — | | — | — |
| PA oligomer PC1 of Ex. E | — | — | — | 10 | 5 | — | — | — | | 10 | — |
| PA oligomer PC1 of Ex. F | — | — | — | — | — | 10 | — | — | | — | — |
| OPERATING CONDITIONS | | | | | | | | | | | |
| Stock temperature 1 | 215 | 215 | 218 | 212 | 215 | 216 | 220 | 223 | | 222 | 220 |
| Stock temperature 2 | 215 | 220 | 222 | 215 | 218 | 216 | 220 | 225 | | 230 | 222 |
| Stock temperature 3 | 225 | 230 | 232 | 228 | 230 | 228 | 230 | 235 | | 243 | 230 |
| Stock temperature 4 | 230 | 230 | 230 | 228 | 231 | 228 | 230 | 240 | | 240 | 233 |
| Stock temperature 5 | 235 | 235 | 237 | 235 | 235 | 235 | 235 | 242 | | 245 | 240 |
| Die head temperature | 230 | 230 | 230 | 230 | 230 | 230 | 230 | 230 | | 230 | 230 |
| Port 1 | | | | | | PREMIX | | | | | |
| Ports 2–4 | | | | | | CLOSED | | | | | |
| Ring R1–R2–R3 | | | | | (33.5–35–35) in all the examples | | | | | | |
| ko screw speed (rev/min) | | | | | | 200 | | (mixer rotation speed) | | | |
| Power current/kWh | 12.8 | 13.8 | 13.8–9 | 13–7.8 | 14–9.3 | 13.5–9 | 14–9.4 | 15–10 | 13.5–9 | 15–10 | 13.5–9 |
| Extruder screw (rev/min) | | | | | | 38 | | (discharge screw rotation speed) | | | |
| (Amp) | 4.7 | 4.6 | 4.7 | 4.6 | 4.7 | 4.8 | 4.7 | 4.8 | 7.8 | 4.8 | 4.8 |
| Throughput (kg/h) | | | | | | 30 | | | | | |

| | Examples | | | |
|---|---|---|---|---|
| | Control 2 | 57412 | 57413 | 57414 |
| PVDF | 65 | 65 | 65 | 65 |
| PA 6.6 | 35 | 25 | 25 | 25 |
| Ungrafted P 767 E PC1 | — | — | — | — |
| MA-g PC1 of Example 5 | — | 10 | — | — |
| MA-g PC1 of Example 7 | — | — | — | 10 |
| GMA-g PC1 of Example 14 | — | — | — | — |
| PA oligomer PC1 of Ex. E | — | — | — | — |
| PA oligomer PC1 of Ex. F | — | — | 10 | — |
| OPERATING CONDITIONS | | | | |
| Stock temperature 1 | 240 | 238 | 230 | 240 |
| Stock temperature 2 | 245 | 245 | 240 | 243 |
| Stock temperature 3 | 250 | 253 | 246 | 254 |
| Stock temperature 4 | 255 | 256 | 248 | 257 |
| Stock temperature 5 | 257 | 260 | 254 | 260 |
| Die head temperature | 280 | 280 | 280 | 280 |
| Port 1 | | | | |
| Ports 2–4 | | | | |
| Ring R1–R2–R3 | | | | |
| ko screw speed (rev/min) | | | | |
| Power current/kWh | 13.25–9 | 13–8.7 | 13–8.7 | 14.8–10.3 |
| Extruder screw (rev/min) | | | | |
| (Amp) | 4.9 | 4.9 | 5 | 5.2 |
| Throughput (kg/h) | | | | |

| | Examples | | | | | | | | |
|---|---|---|---|---|---|---|---|---|---|
| | Control 3 | 57415 | 57416 | 57417 | 57418 | 57419 | 57420 | 57420bis | 57421 | 57422 |
| PVDF | 65 | 65 | 65 | 65 | 65 | 65 | 65 | 62.5 | 55 | 45 |
| PBT | 35 | 25 | 25 | 25 | 25 | 25 | 25 | 22.5 | 35 | 45 |
| Ungrafted P 767 E PC1 | — | 10 | — | — | — | — | — | — | — | — |
| MA-g PC1 of Example 5 | — | — | 10 | — | — | — | — | — | — | — |
| MA-g PC1 of Example 7 | — | — | — | 10 | — | — | — | — | — | — |
| GMA-g PC1 of Example 14 | — | — | — | — | — | — | 10 | 15 | 10 | 10 |
| PA oligomer PC1 of Ex. E | — | — | — | — | 10 | — | — | — | — | — |
| PA oligomer PC1 of Ex. F | — | — | — | — | — | 10 | — | — | — | — |
| OPERATING CONDITIONS | | | | | | | | | | |
| Stock temperature 1 | 220 | 215 | 220 | 220 | 215 | 215 | 217 | 216 | 219 | 225 |
| Stock temperature 2 | 220 | 219 | 220 | 222 | 216 | 215 | 220 | 219 | 220 | 224 |
| Stock temperature 3 | 230 | 226 | 229 | 228 | 224 | 222 | 229 | 230 | 230 | 232 |
| Stock temperature 4 | 230 | 230 | 230 | 230 | 225 | 224 | 230 | 231 | 231 | 233 |
| Stock temperature 5 | 234 | 233 | 233 | 232 | 238 | 228 | 235 | 233 | 236 | 237 |
| Die head temperature | 230 | 230 | 230 | 230 | 230 | 230 | 230 | 230 | 230 | 230 |

TABLE 2-continued

| | | | | | | | | | |
|---|---|---|---|---|---|---|---|---|---|
| Port 1 | | | | PREMIX | | | | | |
| Ports 2-4 | | | | CLOSED | | | | | |
| Ring R1-R2-R3 | | | | (33.5-35-35) in all the examples | | | | | |
| ko screw speed (rev/min) | | | | 200 | (mixer rotation speed) | | | | |
| Power current/kWh | 13.5-9 | 13-8.7 | 13-8.7 | 13.3-8.7 | 12.7-8.4 | 12.7-8.2 | 13-8.7 | 12.7-8.5 | 13.5-8.8 | 13.8-9 |
| Extruder screw (rev/min) | | | | 38 | | | | | | |
| (Amp) | 4.5 | 4.8 | 4.8 | 4.8 | 4.5 | 4.5 | 4.5 | 4.5 | 4.5 | 4.6 |
| Throughput (kg/h) | | | | 30 | | | | | | |

TABLE 3

PVDF/thermoplastics blends produced on the BUSS (bindings and morphological analyses)

| | PVDF 9000 HD | Thermoplastic (Base) | COMPATIBILIZING AGENTS | | | | | | FINDINGS (tests on BUSS) |
|---|---|---|---|---|---|---|---|---|---|
| Examples | | | PCL 767-E | Ex. 5 | Ex. 7 | Ex. E | Ex. F | Ex. 14 | Granulation (a) |
| | | PA6 (B4) | | | | | | | |
| Control 1 | 65 | 35 | | | | | | | 1 |
| 57405 | 65 | 25 | 10 | | | | | | 3 |
| 57406 | 65 | 25 | | 10 | | | | | 4 |
| 57406bis | 65 | 25 | | | 10 | | | | 4 |
| 57407 | 65 | 25 | | | | 10 | | | 4 |
| 57407bis | 67.5 | 27.5 | | | | 5 | | | 4 |
| 57402(2) | 65 | 25 | | | | | 10 | | 4 |
| 57408 | 45 | 45 | 10 | | | | | | 1 |
| 57409 | 25 | 65 | 10 | | | | | | 3 |
| 57411 | 25 | 65 | | | | | | | 4 |
| | | PA66 (VYDINE) | | | | | | | |
| Control 2 | 65 | 35 | | | | | | | 1 |
| 57412 | 65 | 25 | | 10 | | | | | 4 |
| 57413 | 65 | 25 | | | | 10 | | | 3 |
| 57414 | 65 | 25 | | | 10 | | | | 4 |
| | | PBT (TMNO) | | | | | | | |
| Control 3 | 65 | 35 | | | | | | | 1 |
| 57415 | 65 | 25 | 10 | | | | | | 3 |
| 57416 | 65 | 25 | | 10 | | | | | 3 |
| 57417 | 65 | 25 | | | 10 | | | | 3 |
| 57418 | 65 | 25 | | | | 10 | | | 3 |
| 57419 | 65 | 25 | | | | | 10 | | 3 |
| 57420 | 65 | 25 | | | | | | 10 | 4 |
| 57420bis | 62.5 | 22.5 | | | | | | 15 | 4 |
| 57421 | 55 | 35 | | | | | | 10 | 4 |
| 57422 | 45 | 45 | | | | | | 10 | 4 |

| | Apparent | SEM STUDY (MORPHOLOGY) | | |
|---|---|---|---|---|
| Examples | cohesion (b) | Adhesion | Dn (μ) | Findings/dispersion |
| Control 1 | Bad (very fibrous) | 1 | | Bad |
| 57405 | Bad (very fibrous) | | 0.5 | Excellent |
| 57406 | Good | 2 | 0.47 | Excellent |
| 57406bis | Good | 2 | Below 1 | Excellent |
| 57407 | Good | 2 | Below 1 | Excellent |
| 57407bis | Good | 3 | 0.67 | Excellent |
| 57402(2) | Good | 3 | Below 1 | Excellent |
| 57408 | Bad (very fibrous) | | | |
| 57409 | Correct (fibrous) | 1 | | PA6 matrix |
| 57411 | Good | | | PA6 matrix |
| Control 2 | Bad (very fibrous) | 1 | | |
| 57412 | Good | 3 | 0.7 | Excellent |
| 57413 | Good (small fibres) | 3 | | Cocontinuous |
| 57414 | Good | 3 | 2 | Excellent |
| Control 3 | Bad (very fibrous) | 1 | | |
| 57415 | Bad (very fibrous) | | | |
| 57416 | Bad (very fibrous) | | | |
| 57417 | Bad (very fibrous) | | | |
| 57416 | Bad (very fibrous) | | | |
| 57419 | Bad (very fibrous) | | | |
| 57420 | Good | | | |
| 57420bis | Good | 2 | 1 | Good (PVDF matrix) |
| 57421 | Good | 3 | 3 | Cocontinuous |

TABLE 3-continued

| PVDF/thermoplastics blends produced on the BUSS (bindings and morphological analyses) | | | | |
|---|---|---|---|---|
| 57422 | Good | 3 | 1 to 3 | Good (PBT matrix) |

The proportions are by weight.
(a)
1. Bursting of the granulate
2. Presence of large fibres
3. Cuts well (fine fibres)
4. Cuts very well 3) Evaluation of the mechanical Properties of the mixtures.

Some of the above examples and of the controls were injection-moulded in order to obtain ISO R 527 dumbbell-type test pieces (for injection moulding conditions see Table 4). Machining of some dumbbells enables them to be converted into 80×10×4 bars for determination of the flexural modulus (ISO 178), of impact strength (Charpy ISO 179 and IZOD ISO 180) and of the Vicat point (ISO 306).

A qualitative folding test on the test pieces, carried out manually at the bottom of the machine enables a first impression of the strength of these products to be obtained. As a general rule the controls without third bodies do not stand up well to bending, whereas the compatibilized blends withstand this test very well (see Table 4).

The mechanical characteristics are given in Table 5. In the case of the PVDF 9000/PA6 pair (Examples 57406, 407, 409 and 411) the best results are obtained with an MA-grafted PCL (Example 5 employed in Example 57406) and a PA6 oligomer-grafted PCL (Example E employed in Example 57407). In the case of these two examples, not only are the values of load and elongation at break close to PVDF 9000, but the impact strength is improved in comparison to control 1 without any third body.

While the control test of the PVDF 9000/PA66 pair is very brittle (breakage on bending of the test pieces of control 2), with the addition of 10% of MA-grafted PCL (of Example 5), a final material is successfully obtained which is endowed with good break characteristics and better impact strength than PVDF (Example 57412/control 2).

Finally, in the case of the PVDF 9000/PBT pair, the use of GMA-grafted PCL (of Example 14) makes it possible to improve in a marked manner the elongation at break and the impact strength of the blends (Examples 57420 and 57420 bis/control 3) in comparison with the control test (control 3).

A second series of examples was produced on a Buss by employing PVDF 1000 HD of higher molecular mass (when compared with a 9000 HD), and therefore with better intrinsic properties. The disadvantage of the 1000 HD is that it is markedly more viscous than the 9000 HD and therefore less favourable for obtaining a PVDF matrix. The properties of the examples thus produced (PVDF 1000 HD+PA6 or PA66, see Table 6), are compared with the same controls 1 and 2 without third bodies and with the Examples with PVDF 9000 HD.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 4

Production of ISO 527 dumbbells by injection moulding (KM B2 press)

| Examples | Inj. T° (°C.) | Mould T° (°C.) | Inj. P (bar) | Hold P. (bar) | Prop. (mm) | Inj. R. (%) | Hold time (s) | Cool. time (s) | Bal. pt (mm) | Screw s. (rev/min) | Findings (Test piece appearance) | Bending strength (°) of the test pieces |
|---|---|---|---|---|---|---|---|---|---|---|---|---|
| PVCF 9000 | 240–260 | 50 | 200 | 50 | 44 | 80 | 15 | 15 | 12 | 170 | Homogeneous (translucent) | |
| Control 1 | 240–260 | 50 | 200 | 50 | 44 | 80 | 15 | 15 | 12 | 170 | Low homogeneity (slightly pearly) | ○ |
| 57406 | 240–260 | 50 | 200 | 50 | 44 | 80 | 15 | 15 | 12 | 170 | Homogeneous | ● |
| 57407 | 240–260 | 50 | 200 | 50 | 44 | 80 | 15 | 15 | 12 | 170 | Homogeneous | ● |
| 57409 | 240–260 | 50 | 200 | 50 | 44 | 80 | 15 | 15 | 12 | 170 | Low homogeneity (slightly pearly) | ● |
| 57411 | 240–260 | 50 | 200 | 50 | 44 | 80 | 15 | 15 | 12 | 170 | Low homogeneity (slightly pearly) | ● |
| Control 2 | 240–260 | 50 | 200 | 50 | 44 | 80 | 15 | 15 | 12 | 170 | Not homogeneous | ○ |
| 57412 | 260–280 | 50 | 200 | 50 | 44 | 80 | 15 | 15 | 12 | 170 | Homogeneous | ● |
| 57414 | 260–280 | 50 | 200 | 50 | 44 | 80 | 15 | 15 | 12 | 170 | Homogeneous | ● |
| Control 3 | 240–260 | 50 | 200 | 50 | 44 | 80 | 15 | 15 | 12 | 170 | Not homogeneous (very pearly) | ○ |
| 57420 | 240–260 | 50 | 200 | 50 | 44 | 80 | 15 | 15 | 12 | 170 | Low homogeneity (very pearly) | ● |
| 57420bis | 240–260 | 50 | 200 | 50 | 44 | 80 | 15 | 15 | 12 | 170 | Low homogeneity (very pearly) | ● |

(°) ○ Poor strength
● Very good strength

TABLE 5

Mechanical properties of the PVDF/PA6, PA66 or PBT blends on test pieces

| Ref. 1* (Examples) | TENSILE TESTS on dumbbells (ISO R 527)* | | | | | | | | TENSILE TESTS**** | | | | |
|---|---|---|---|---|---|---|---|---|---|---|---|---|---|
| | Modulus MPa | Poisson | Stress at 5% | E flex | Tens. yield Load MPa | Tens. yield Elong. % | Tens. break Load MPa | Tens. break Elong. % | E flex/ E tens. | Modulus MPa | Tens. yield Load MPa | Tens. yield Elong. % | Tens. break Load MPa | Tens. break Elong. % |
| PVDF 9000 | 1918 | 0.422 | 43.9 | | 55 | 7 | 42 | 25 | | | | | | |
| Control 1 | 2085 | 0.396 | 45.3 | 1692 (±71) | 56 | 6 | 53 | 16 | 0.82 | 1251 | | | 50.4 | 7 |
| 57406 | 1422 | 0.424 | 31.3 | 1286 (±18) | 41 | 10 | 40 | 25 | 0.89 | 937 | | | 32.4 | 4.3 |
| 57407 | 1691 | 0.419 | 36.5 | 1370 (±89) | 47 | 10 | 46 | 18 | 0.81 | 868 | | | 35.6 | 5.5 |
| | | | | | | | | | | 917 | | | 32.9 | 3.8 |
| 57409 | 1820 | 0.400 | 39.7 | 1502 (±90) | 49 | 5 | 42 | 80 | | 976 | 42.2 | 11.6 | 39.2 | 141 |
| 57411 | 1970 | 0.399 | 40.6 | 1550 (±141) | 53 | 5 | 44 | 50 | | 773 | 36.5 | 14.1 | 40.7 | 205 |
| Control 2 | 2311 | 0.390 | A | | | | <20 | <1% | | Impossible to cut the test pieces | | | | |
| 57412 | 1738 | 0.418 | 37.9 | 1619 (±62) | 49 | 9 | 47 | 20 | 0.94 | 1109 | | | 30.6 | 3 |
| | | | | | | | | | | Test pieces broken before 3% elongation | | | | |
| 57414 | 1742 | 0.405 | 38.2 | 1745 (±115) | 49 | 4 | 48 | 13 | 0.99 | | | | 30.7 | 2.9 |
| Control 3 | 2060 | 0.409 | 42 | | | | 51 | 8 | | 1057 | | | 25.7 | 3.2 |
| 57420 | 1644 | 0.416 | 35.7 | 1642 (±48) | 45 | 9 | 41 | 20 | 0.99 | 1063 | | | 37.2 | 5.5 |
| 57420bis | 1486 | 0.423 | 32.1 | | 43 | 9 | | | | 961 | | | 31.6 | 4.4 |
| | | | | | | | | | | 1085 | | | 41.5 | 5.3 |
| | | | | | | | | | | | | | 38.6 | 5 |

| Ref. 1* (Examples) | FLEXURAL TESTS** | | | IMPACT TESTS** | | VICAT*** |
|---|---|---|---|---|---|---|
| | Modulus MPa | Maximum stress MPa | Deflection at max. stress (mm) | IZOD (ISO 180) (kJ/m²) | CHARPY (ISO 179) (kJ/m²) | Softening Temp. (°C.) |
| PVDF 9000 | 2012 | 73.3 | 11.2 | 7.5 | 12.5 | 131 s = 1 |
| Control 1 | 1660 | 64.0 | 11.5 | 7.2 | 13 | 137 s = 3 |
| 57406 | 1286 | 45.1 | 11.7 | 10.7 | 16 | 89 s = 3 |
| 57407 | 1327 | 47.9 | 11.6 | 8.9 | 13 | 92 s = 3 |
| 57409 | 1492 | 55.4 | 11.4 | 16.4 | 27 | 128 s = 6 |
| 57411 | 1482 | 58.3 | 11.3 | 15.1 | 29 | 137 s = 5 |
| Control 2 | 2062 | 71.5 (n = 2) | 10 | 3.7 | 11 | 150 s = 2 |
| 57412 | 1597 | 54.0 | 11.4 | 9.8 | 16 | 97 s = 3 |
| 57414 | 1652 | 59.9 | 11.4 | 7.9 | 11 | 97 s = 3 |
| Control 3 | 2151 | 75.4 (n = 3) | 10 | 5.8 | 7.8 | 131 s = 3 |
| 57420 | 1642 | 55.2 | 10.8 | 9.8 | 16 | 94 s = 3 |
| 57420bis | 1630 | 56.2 | 10.7 | 9.9 | 14.9 | 81 s = 1 |

1*: See blend compositions Table 3.
**: Tests carried out on 80 × 10 × 4 bars machined from ISO R 527 type 1 dumbbells, conditioned 14 days at 23° C. and 50% RH, test at ambient temperature (23° C.).
***: Load applied: 50 N; temperature rise: 50° C./h.

TABLE 6

Mechanical properties of the PVDF 1000/PA6 or PA66.
Comparisons with the tests based on PVDF 9000 (shaded lines)

| Ref. 1* (Examples) | Injection T° (°C.) | COMPOSITION | | | | | | TENSILE TESTS* | | | |
|---|---|---|---|---|---|---|---|---|---|---|---|
| | | PVDF 9000 HD | PVDF 1000 HD | PA6 UB 4 | PA66 Vydine | Ex. 5 | Ex. E Third body | Tens. yield Load Mpa | Tens. yield Elong. % | Tens. break Load Mpa | Tens. break Elong. % |
| PVDF 9000 | 240–260 | 100 | | | | | | 55 | 7.0 | 42 | 25 |
| Control 1 | 240–260 | 65 | | 35 | | | | 56 | 6 | 53 | 16 |
| 57406 | 240–260 | 65 | | 25 | | 10 | | 41 | 10 | 40 | 25 |
| 57837 (1) | 240–260 | | 65 | 25 | | 10 | | 44.6 | 11.5 | 39 | 39 |
| 57837 (2) | 230–250 | | 65 | 25 | | 10 | | 45.2 | 11 | 40 | 30 |
| 57407 | 240–260 | 65 | | 25 | | | 10 | 47 | 10 | 48 | 18 |
| 57838 (1) | 240–260 | | 65 | 25 | | | 10 | 46.8 | 11.4 | 45 | 20 |
| 57838 (2) | 230–250 | | 65 | 25 | | | 10 | 46.7 | 10.7 | 45 | 21 |
| Control 2 | 240–260 | 65 | | | 35 | | | — | — | 20 | <1% |
| 57412 | 260–280 | 65 | | | 25 | 10 | | 49 | 9 | 47 | 20 |
| 57840 (1) | 260–280 | | | | 25 | 10 | | | | 42 | 5 |
| 57840 (2) | 240–260 | | | | 25 | 10 | | | | 27 | 1.8 |

TABLE 6-continued

Mechanical properties of the PVDF 1000/PA6 or PA66.
Comparisons with the tests based on PVDF 9000 (shaded lines)

| Ref. 1* (Examples) | Injection T° (°C.) | FLEXURAL TESTS** | | | IMPACT TESTS** | | VICAT*** |
|---|---|---|---|---|---|---|---|
| | | Modulus MPa | Maximum stress MPa | Deflection at max. stress (mm) | IZOD (ISO 180) (kJ/m²) | CHARPY (ISO 179) (kJ/m²) | Softening Temp. (°C.) |
| PVDF 9000 | 240–260 | 2012 | 73.3 | 11.2 | 7.5 | 12.5 | 131 s = 1 |
| Control 1 | 240–260 | 1660 | 64 | 11.5 | 7.2 | 13 | |
| 57406 | 240–260 | 1286 | 45.1 | 11.7 | 10.7 | 16 | 89 s = 3 |
| 57837 (1) | 240–260 | 1560 | 46.8 | | 8.2 | 15.1 | |
| 57837 (2) | 230–250 | 1560 | 46.9 | | 9.5 | 16.7 | |
| 57407 | 240–260 | 1327 | 47.9 | 11.6 | 8.9 | 13 | 92 s = 3 |
| 57838 (1) | 240–260 | 1628 | 49.3 | | 7.3 | 12.6 | |
| 57838 (2) | 230–250 | 1628 | 48.9 | | 7.1 | 12.9 | |
| Control 2 | 240–260 | 2062 | 71.5 | 10 | 3.7 | 11 | 150 |
| 57412 | 260–280 | 1597 | 54 | 11.4 | 9.8 | 16 | 97 s = 3 |
| 57840 (1) | 260–280 | 1863 | 55.1 | | 3.9 | 5.1 | |
| 57840 (2) | 240–260 | 1838 | 54.1 | | 5.2 | 7.8 | |

*: Tests carried out on ISO R 527 type 1 dumbbells conditioned 14 days at 23° C. and 50% RH.
**: Tests carried out on 80 × 10 × 4 bars conditioned 14 days at 23° C. and 50% RH.
For impact tests: V type A notch

We claim:

1. Amended) Mixtures of polymers consisting essentially of:
   one halogen-containing polymer
   another polymer which has substantially no compatibility with said one halogen-containing polymer, and
   a grafted aliphatic polyester as compatibiizer wherein (i) the halogen-containing polymer is selected from the group consisting of PVC, chlorinated PVC, plasticized PVC, PVC-based compounds, PVDF and its copolymers and PVF3 and (ii) which include another polymer selected from the group consisting of EVOH, PB and PA.

2. Mixtures according to claim 1, wherein the aliphatic polyester is grafted with a monomer selected from the group consisting of:
   unsaturated carboxylic acids;
   unsaturated products carrying expoxidized functional groups, and
   vinyl esters.

3. Mixtures according to claim 1, wherein the polyester is polycaprolactone.

4. Polymer having a substantially incompatible component consisting essentially of at least one halogen-containing polymer compatibilized with a grafted aliphatic polyester; said halogen-containing polymer including polyvinyl chloride, chlorinated polyvinyl chloride, plasticized polyvinyl chloride, polyvinyl chloride-based compound, polyvinyl difluoride and its copolymers and polytrifluoroethylene; said grafted aliphatic polyester compatibilizes said halogen-containing polymer with another polymer being substantially incompatible with it; said other polymer including ethylene vinyl alcohol copolymers, polyesters including polyethylene terephthalate, and polybutylene terephthalate, polyamides, said aliphatic polyester including linear polylactones including polyaprolactone, polycaprolactone, polypivalolactone or polyenantholactone or polycaprylolactone, and at least one monomer being grafted onto the aliphatic polyester selected from the group consisting of unsaturated carboxylic acids, their salts, their esters and their anhydrides, unsaturated products carrying epoxidized functional groups, vinyl esters, styrene and its derivatives, the grafted monomer being less than 15% by weight of the aliphatic polyesters.

5. The polymer according to claim 4, wherein at least one monomer is selected from the group consisting of:
   (meth)acrylic acid, fumaric acid, mesaconic acid, alkyl(meth)acrylates such as methyl methacrylate, butyl acrylate, tert-butyl acrylate or hydroxyethyl acrylate,
   citraconic anhydride, itaconic anhydride, tetrahydrophthalic anhydride, 2-methylmaleic anhydride, 2,3-dimethylmaleic anhydride and maleic anhydride,
   aliphatic glycidyl esters and ethers such as glycidyl (meth)acrylate, glycidyl maleate, glycidyl itaconate, vinyl glycidyl ether and alkyl glycidyl ethers,
   aliphatic glycidyl esters and ethers including 2-cyclohex-1-ene glycidyl ether, diglycidyl cyclohexane-4,5-dicarboxylate, glycidyl cyclohexene-4-carboxylate, glycidyl 2-methyl-5-norbornene-2-carboxylate and diglycidyl endocis-bicyclo(2.2.1) -5-heptene-2,3-dicarboxylate, vinylcyclohexene monoxide and METHB,
   vinyl acetate.

6. The polymer according to claim 4 wherein the polymer is a 20% by weight of ethylene-vinyl alcohol-polyvinyl chloride mixture.

7. The polymer according to claim 4, wherein the polymer is a polyvinyl chloride-polyethylene terephthalate mixture.

8. The polymer according to claim 4, wherein the polyamide or polyamide oligomer compatibilizing agent comprises 1 to 10% by weight of the polymer.

9. The polymer according to claim 4, wherein the polyamide or polyamide oligomer compatibilizing agent comprises 2 to 5% by weight of the polymer.

10. The polymer according to claim 4, wherein the polymer is a polyvinyl chloride-polystyrene mixture.

11. The polymer according to claim 4, wherein the polymer is a polyvinyldifluoride-polystyrene mixture.

12. Mixtures of polymers consisting essentially of:
    one halogen-containing polymer
    another polymer which has substantially no compatibility with said one halogen-containing polymer, and
    a grafted aliphatic polyester as compatibiizer wherein (i) the halogen-containing polymer is selected from the group consisting of PVC, chlorinated PVC, plasticized PVC, PVC-based compounds, PVDF and its copolymers and PVF3 and (ii) which include another polymer selected from the group consisting of EVOH, PBT, PS and PA.

* * * * *